US010731504B2

(12) United States Patent
Vonfelt et al.

(10) Patent No.: US 10,731,504 B2
(45) Date of Patent: Aug. 4, 2020

(54) DEVICE FOR CONTROLLING INLET GUIDE VANES BY MEANS OF A MULTILAYER PIEZOELECTRIC ACTUATOR

(71) Applicant: SAFRAN HELICOPTER ENGINES, Bordes (FR)

(72) Inventors: Jean-Julien Camille Vonfelt, Moissy-Cramayel (FR); Thomas Klonowski, Moissy-Cramayel (FR); Antoine Moutaux, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/330,138

(22) PCT Filed: Aug. 24, 2017

(86) PCT No.: PCT/FR2017/052270
§ 371 (c)(1),
(2) Date: Mar. 4, 2019

(87) PCT Pub. No.: WO2018/046818
PCT Pub. Date: Mar. 15, 2018

(65) Prior Publication Data
US 2019/0211702 A1      Jul. 11, 2019

(30) Foreign Application Priority Data
Sep. 8, 2016    (FR) ..................... 16 58348

(51) Int. Cl.
*F01D 17/24* (2006.01)
*F01D 17/16* (2006.01)
(Continued)

(52) U.S. Cl.
CPC ............. *F01D 17/24* (2013.01); *F01D 9/041* (2013.01); *F01D 17/162* (2013.01); *F02C 9/20* (2013.01);
(Continued)

(58) Field of Classification Search
CPC ........ F01D 17/24; F01D 17/162; F01D 17/12; F01D 17/14; F02C 9/20; F05D 2240/515
See application file for complete search history.

(56) References Cited

U.S. PATENT DOCUMENTS 9,394,804 B2 *   7/2016  Rusovici ............... F01D 17/162
9,932,851 B2 *   4/2018  Dougherty .............. F01D 9/041
(Continued)

FOREIGN PATENT DOCUMENTS

DE    10 2014 001 034 A1    7/2015

OTHER PUBLICATIONS

International Search Report dated Nov. 22, 2017 in PCT/FR2017/052270 filed on Aug. 24, 2017.

*Primary Examiner* — Eldon T Brockman
(74) *Attorney, Agent, or Firm* — Oblon, McClelland, Maier & Neustadt, L.L.P.

(57) ABSTRACT

An electric actuator for inlet guide vanes of a gas turbine engine, the electric actuator including a fixed portion secured to a stationary portion of the engine and a movable portion that is mechanically connected to the inlet guide vanes, stationary electromagnets distributed at regular intervals around the periphery of the movable portion and fastened to the fixed portion, and movable electromagnets arranged between the stationary electromagnets, each movable electromagnet being secured on either side to first and second piezoelectric elements, the movable electromagnets and the first and second piezoelectric elements having a degree of freedom of movement relative to the movable (Continued)

portion and having inside faces forming a common line of contact that is tangential to the movable portion.

10 Claims, 4 Drawing Sheets

(51) Int. Cl.
    *F01D 9/04*         (2006.01)
    *F02C 9/20*         (2006.01)

(52) U.S. Cl.
    CPC ....... *F05D 2240/515* (2013.01); *Y02T 50/671* (2013.01)

(56) References Cited

U.S. PATENT DOCUMENTS

| | | | |
|---|---|---|---|
| 10,100,663 B2* | 10/2018 | Longworth | F01D 17/162 |
| 10,273,976 B2* | 4/2019 | Jemora | F04D 29/563 |
| 2014/0286745 A1* | 9/2014 | Rusovici | F01D 17/162 |
| | | | 415/1 |
| 2015/0184535 A1* | 7/2015 | Dougherty | F01D 9/041 |
| | | | 415/1 |
| 2016/0356173 A1* | 12/2016 | Longworth | F01D 17/162 |
| 2018/0223867 A1* | 8/2018 | Jemora | F04D 29/563 |

* cited by examiner

DEVICE FOR CONTROLLING INLET GUIDE VANES BY MEANS OF A MULTILAYER PIEZOELECTRIC ACTUATOR

BACKGROUND OF THE INVENTION

The present invention relates to the general field of compressors and turbines of aeroengines (in particular for airplanes or helicopters). More precisely the invention relates to controlling inlet guide vanes (IGVs) of a gas turbine engine.

The actuators of the IGVs are used to control the position of the prerotation vanes situated upstream from the compressor stage(s) on helicopter turbine engines (see for example US 2014/0286745). The function of such an actuator consists in directing the flow of air entering the engine upstream from the compressor. Varying the angular position of the prerotation vanes makes it possible to optimize the overall performance of the engine (transients and specific consumption).

The function of controlling the inlet guide vanes is usually provided by a hydraulic actuator powered by the fuel circuit having its flow rate and pressures directly indexed to the speed of the gas generator. However, such an architecture presents numerous drawbacks.

Firstly, due to their reversibility, present-day hydraulic actuators do not have "position memory" or "fail freeze", i.e. in the event of a failure they do not maintain the last controlled position. Secondly, those actuators are dimensioned for a wide range of pressures and flow rates, which, due to interactions with the fuel circuit, causes real disruption to the fuel metering system each time fuel drives the actuator. The working pressure difference varies greatly depending on the engine operating point (low delta P when idling and high delta P at high speed). In addition, that overdimensioning has a non-negligible impact on the weight of the engine and causes unnecessary heating of the fuel and indirectly draws unwanted power from the accessory gearbox. Finally, those actuators are controllable only when the engine is in operation, which is particularly detrimental in the context of certain daily maintenance operations, such as engine endoscope inspections where the vanes need to be moved without starting the engine, since that requires the use of an external hydraulic unit.

U.S. Pat. No. 7,096,657 discloses a control system for controlling inlet guide vanes by means of a electric actuator that is provided redundantly, which can be either a brushless DC motor or an induction or variable reluctance AC motor. However, the use of a brushless motor requires control electronics that are particularly complex and restrictive from a point of view of electromagnetic compatibility, and the powers involved are not sufficient under all flight conditions. Similarly, in the event of a short circuit on the variable reluctance motor or its control electronics, the braking torque generated by the short circuit is very low or even zero, which necessarily requires the use of an external electric brake (energize-to-release type brakes) to freeze the last controlled position. This information is essential in order to switch safely to a degraded mode of controlling the motor. For both of these two types of motor, the same applies in the event of a loss of power.

There is therefore currently a need to control inlet guide vanes by means of a new actuator that does not have the above-mentioned drawbacks.

OBJECT AND SUMMARY OF THE INVENTION

The present invention thus aims to mitigate the above-mentioned drawbacks by providing an efficient and optimized actuator solely for the function of controlling the IGVs and also presenting particularly safe behavior.

This object is achieved by means of an electric actuator for inlet guide vanes of a gas turbine engine, the electric actuator comprising a fixed portion secured to a stationary portion of said engine and a movable portion that is mechanically connected to said inlet guide vanes, said electric actuator being characterized in that it comprises stationary electromagnets distributed at regular intervals around the periphery of said movable portion and fastened to said fixed portion, and movable electromagnets arranged between said stationary electromagnets, each movable electromagnet being secured on either side to first and second piezoelectric elements, said movable electromagnets and said first and second piezoelectric elements having a degree of freedom of movement relative to said movable portion.

With this new electrical architecture, the structural overdimensioning of prior art systems is removed and the fuel circuit may thus be optimized independently of the function of controlling the IGVs.

Advantageously, the fixed portion is a stator of a rotary actuator, the movable portion is a rotor of a rotary actuator, and said degree of freedom of movement is a degree of freedom to rotate about an axis of rotation of said rotor.

Preferably, each piezoelectric element is made up of a series of N ceramics arranged in one or more layers.

Advantageously, said piezoelectric element comprises two superposed layers of ten ceramics arranged in parallel.

Preferably, said stationary electromagnets constitute an integral portion of said stator, thus forming internal serrations.

Advantageously, said stationary electromagnets are electrically connected in parallel to a first DC voltage source DC1, and said movable electromagnets are electrically connected in parallel to a second DC voltage source DC2.

Preferably, said DC voltage sources deliver two opposite signals.

Advantageously, said first piezoelectric element is electrically connected in parallel to a first AC voltage source AC1, and said second piezoelectric element is electrically connected in parallel to a second AC voltage source AC2.

Preferably, said AC voltage sources deliver two sine-wave voltages of opposite phase that are characterized by the following relationships:

$$AC1 = A\sin\omega(t) \text{ and } AC2 = A\sin(\omega(t)+\pi)$$

The invention also provides a gas turbine engine including at least one above-mentioned electric actuator.

BRIEF DESCRIPTION OF THE DRAWINGS

Other characteristics and advantages of the present invention appear from the following description made with reference to the accompanying drawings, which show an embodiment of non-limiting character. In the figures.

DETAILED DESCRIPTION OF THE INVENTION

Figure 1:
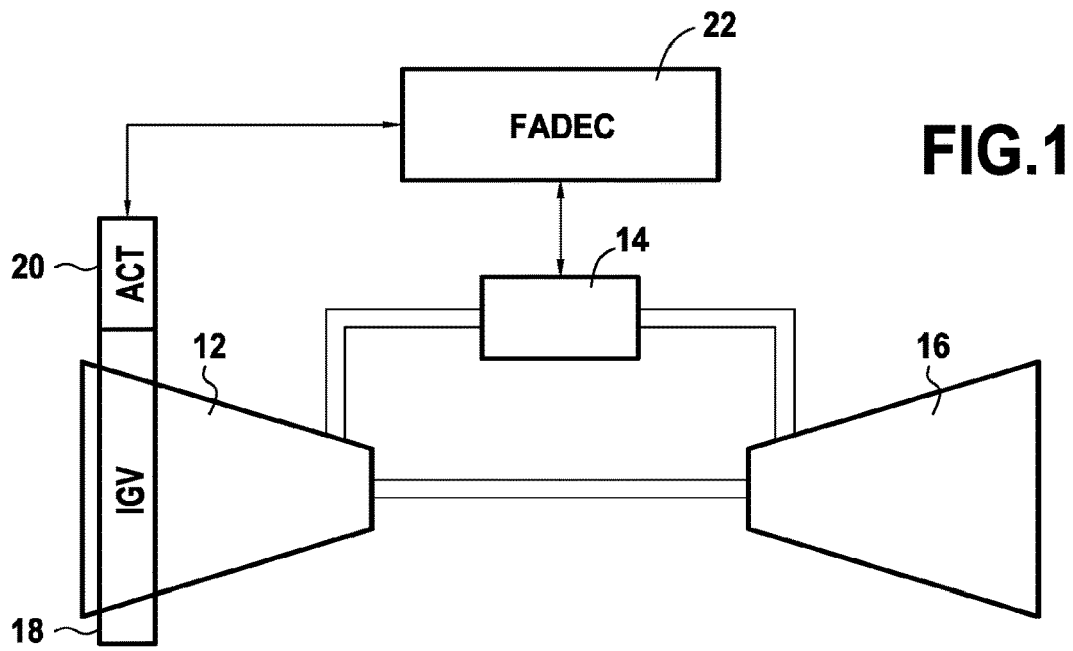
FIG. 1 is a diagrammatic view of a gas turbine engine to which the invention applies.
Figure 2:
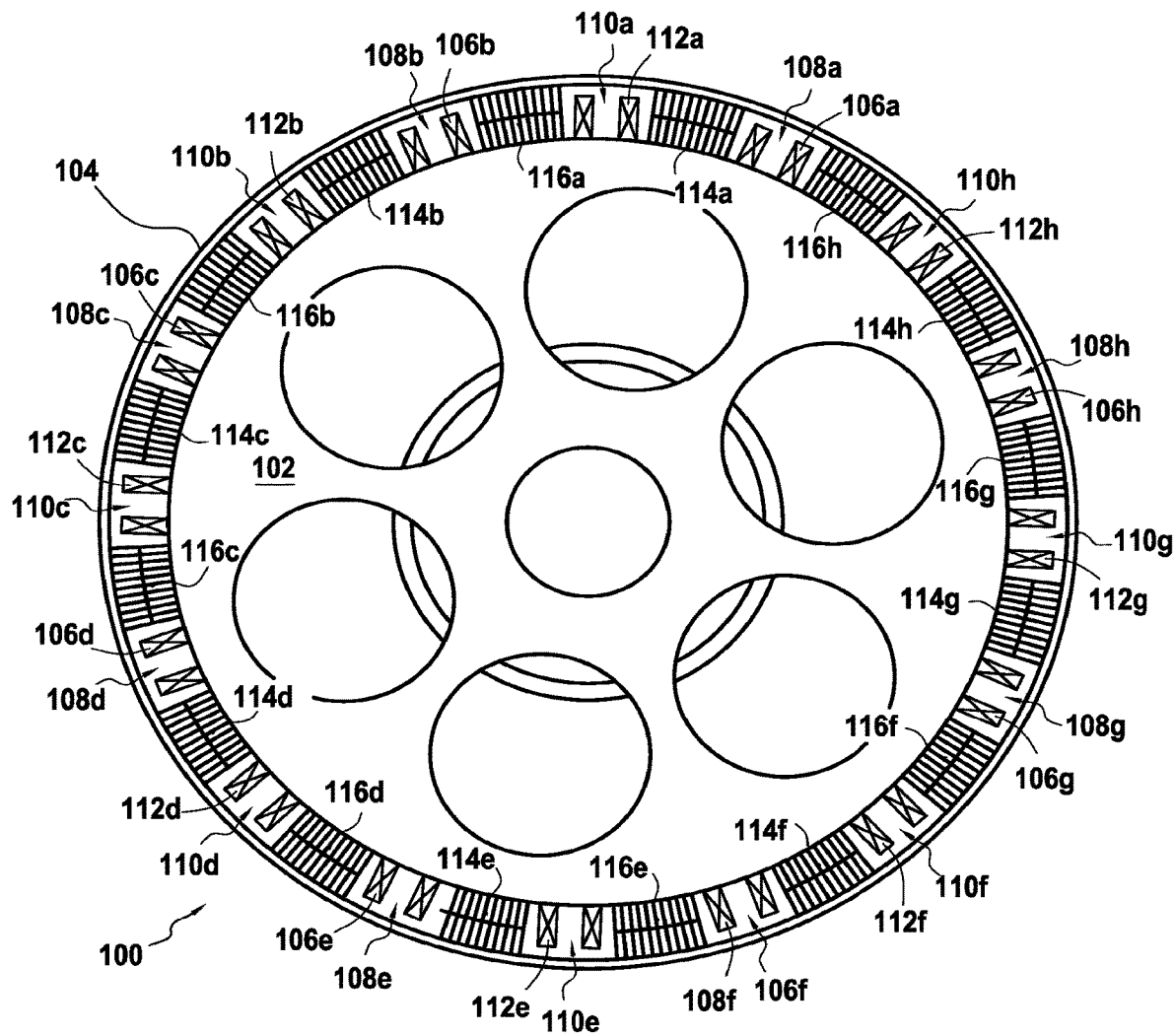
FIG. 2 shows a first example of an electric rotary actuator in accordance with the invention for controlling inlet guide vanes of the FIG. 1 engine.

FIG. 1 is a diagram of a gas turbine engine 10 conventionally comprising a compressor 12, a combustion chamber 14, and a turbine 16 designed to drive the vanes of the engine (not shown). Inlet guide vanes (IGVs) 18 are arranged at the inlet of the compressor 12 and they are moved in rotation by one or more actuators (ACT) 20 controlled by a central computer (FADEC) 22 that also manages the engine and in particular the injection of gas into the combustion chamber. In the invention, the actuator of the inlet guide vanes is an electric actuator in the form of the particular rotary piezoelectric motor shown in FIG. 2.

The piezoelectric motor 100 comprises a central rotor 102 that surrounds an annular stator 104. The central rotor, which is advantageously perforated to save weight, is connected in fixed manner to the lever that actuates the inlet guide vanes, the lever having a pivot connection with the casing of the engine, whereas the stator has a fixed connection to a stationary portion of the engine. Depending on the nature of the rotor material, magnetic bodies, distributed at regular intervals around the periphery of the rotor and mechanically fastened or bonded to the stator, co-operate with the associated windings 106a-106h to form stationary electromagnets 108a-108h that are positioned at regular intervals. The magnetic bodies can also constitute an integral portion of the stator, thus forming internal serrations.

Movable electromagnets 110a-110h (each formed by magnetic bodies and associated windings 112a-112h) are arranged between these stationary electromagnets, each stationary electromagnet being secured on either side to a piezoelectric element 114a-114h; 116a-116h. Each piezoelectric element is made up of a series of ceramics arranged in one or more layers. In the embodiment shown, which is not to be considered as limiting, a piezoelectric element comprises two superposed layers of ten ceramics placed in parallel. The height of the ceramic layer(s) corresponds to the height of the stationary or movable magnetic bodies that surround them, in such a manner that the inside faces of these various components form a common line of contact that is tangential to the central rotor 102. With this configuration, the movable electromagnets 110a-110h and the first and second piezoelectric elements 114a-114h; 116a-116h have a degree of freedom of movement in rotation about the axis of the central rotor 102, without any friction between the stator and the rotor (due to the presence of an airgap (not referenced)), unlike a piezoelectric motor configuration of known type. This airgap, in association with the manner in which the piezoelectric elements are used, makes it possible to counteract one of the main problems connected with this piezoelectric technology: namely wear of the polymers on which the piezoelectric components are bonded. By limiting or removing friction, the lifetime and the availability of the equipment is increased, making it compatible with use in aviation.

Figure 3:
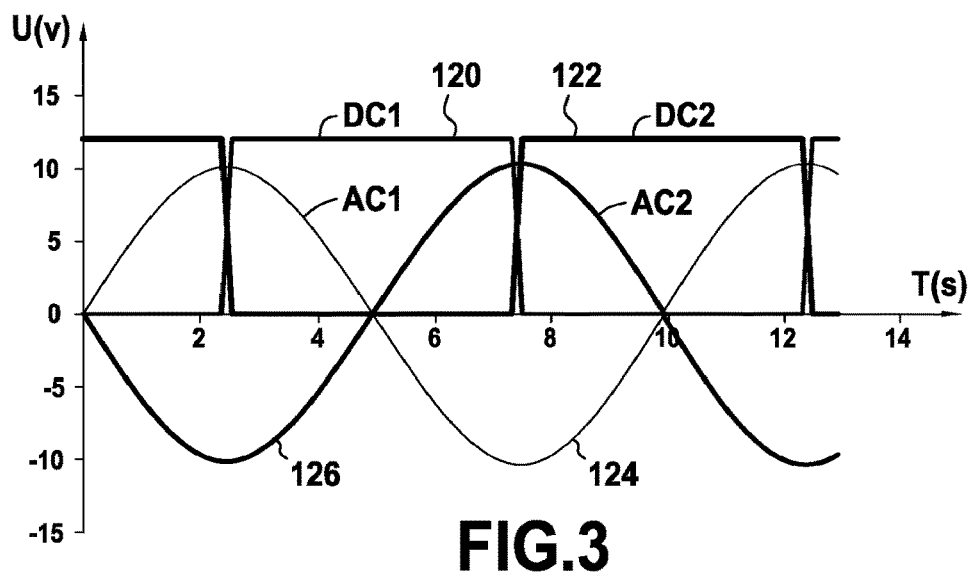
FIG. 3 shows the various electrical power supplies required to operate the FIG. 2 actuator.

Operation of the motor is now explained with reference to FIG. 3 and to FIGS. 4A to 4D, which show the control signals and the corresponding movements of the central rotor during an operating cycle of the engine.

Figure 4A:
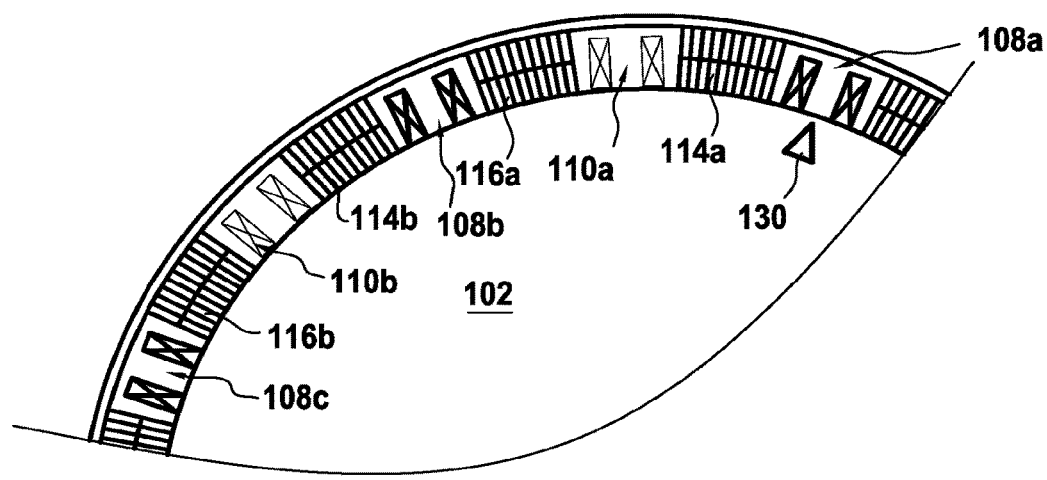
FIGS. 4A-4D show the various steps of movement of the rotor of the FIG. 2 actuator.
Figure 4B:
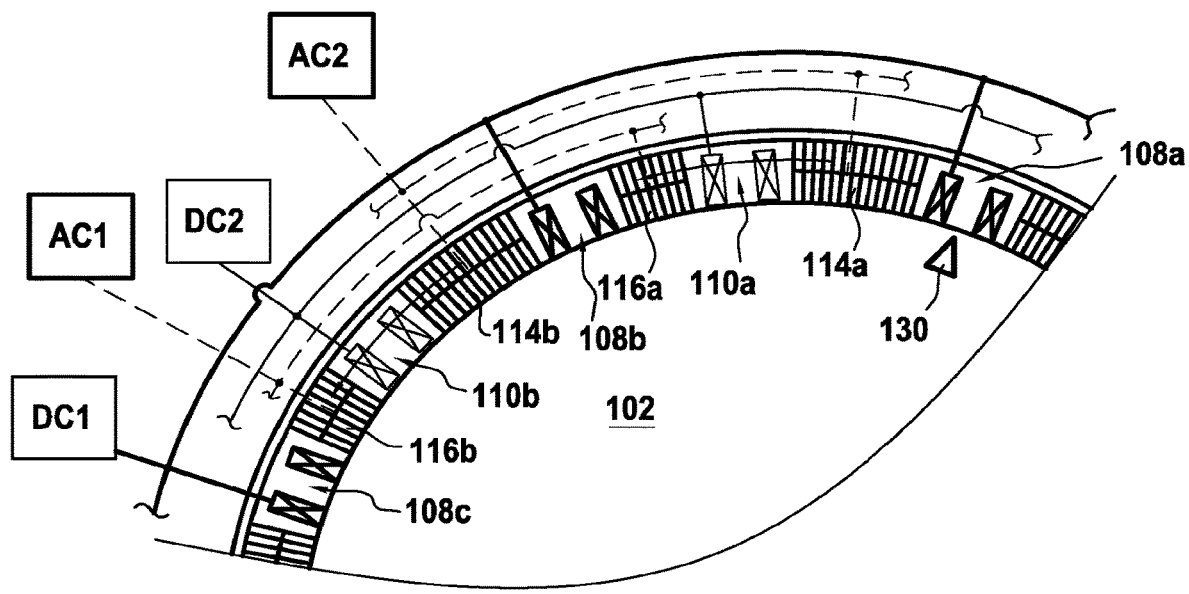

As shown in FIG. 4B, the stationary electromagnets 108a, 108b, 108c are electrically connected in parallel to a first DC voltage source DC1 (curve 120 in FIG. 3) and the movable electromagnets 110a, 110b are electrically connected in parallel to a second source of DC voltage DC2 (curve 122 in FIG. 3), the DC sources DC1 and DC2 delivering opposite signals. The first piezoelectric element 114a, 114b is electrically connected in parallel to a first AC voltage source AC1 (curve 124 in FIG. 3) and the second piezoelectric element 116a, 116b is electrically connected in parallel to a second AC voltage source AC2 (curve 126 in FIG. 3). The AC voltage sources deliver two sine-wave voltages of opposite phase and they are therefore characterized by the following relationships:

$$AC1 = A \sin \omega(t) \text{ and } AC2 = A \sin(\omega(t) + n)$$

In order to drive the piezoelectric motor, the piezoelectric elements and electromagnets must be powered in two steps, defining four successive stages as follows:

FIG. 4A shows the initial stage in which the stationary electromagnets 108a, 108b, 108c have a current passing therethrough (the voltage source DC1 is positive) and therefore maintain contact with the central rotor 102. The movable electromagnets 110a, 110b are deactivated (the DC voltage source DC2 is at zero) and the first and second piezoelectric elements 114a, 114b; 116a, 116b are in the initial rest position.

In FIG. 4B, while the stationary electromagnets 108a, 108b, 108c with current passing therethrough maintain contact with the central rotor 102, the first piezoelectric elements 114a, 114b lengthen and the second piezoelectric elements 116a, 116b retract, causing the movable electromagnets 110a, 110b to which they are secured and that are unpowered (the DC voltage source DC2 is maintained at zero) to move with them in their simultaneous lengthening/retracting movement (in the direction shown by the arrow).

Figure 4C:
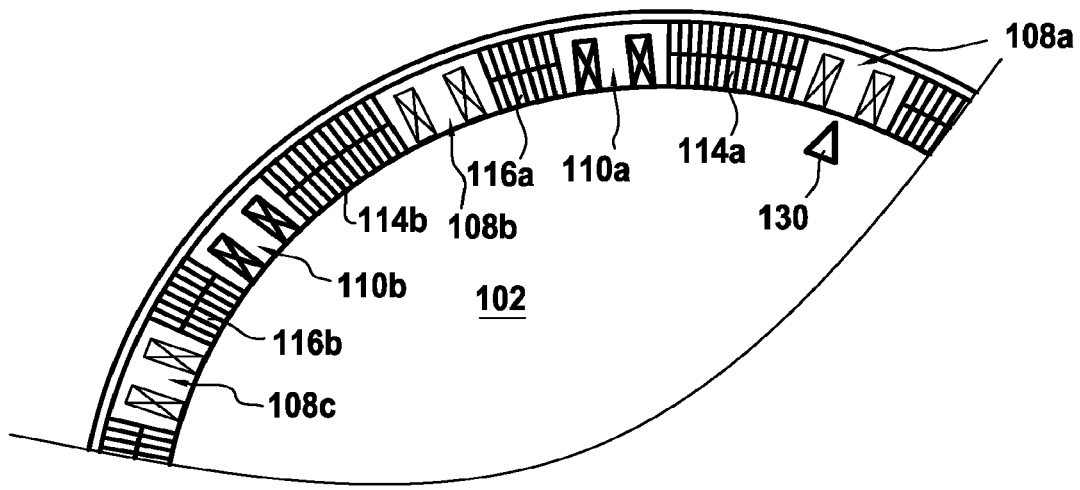

In FIG. 4C, the lengthening/retracting movement of the piezoelectric elements has ended and the movable electromagnets 110a, 110b are thus powered (the voltage source DC2 is made positive) in order to maintain contact with the central rotor 102. Simultaneously, the stationary electromagnets 108a, 108b, 108c are deactivated (the DC voltage source DC1 is set to zero).

Figure 4D:
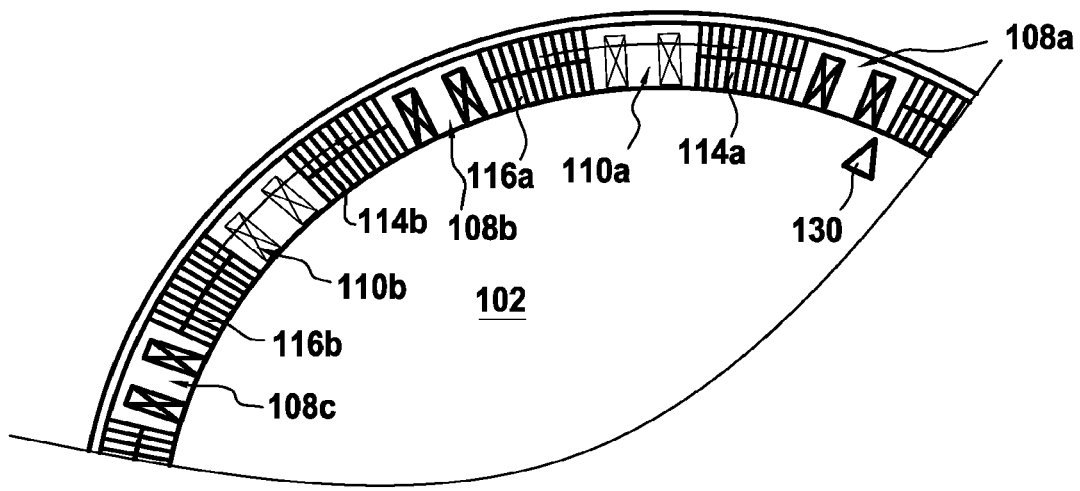

FIG. 4D shows the last stage when the first piezoelectric elements 114a, 114b retract and the second piezoelectric elements 116a, 116b lengthen so as to return to their initial shape, causing the movable electromagnets 110a, 110b to move with them (in the direction shown by the arrow) and therefore also moving the central rotor 102 on which they are held in contact. By observing the rotation of index 130, it can be seen that the actual rotation of the motor corresponds to a cycle of lengthening/retracting of the piezoelectric elements.

In order to operate the motor in the opposite direction, it is necessary to reverse the direction of control of the electromagnets or to interchange the phases of the first and second AC voltage sources AC1 and AC2 in such a manner that the second is in advance of the first.

Figure 5:
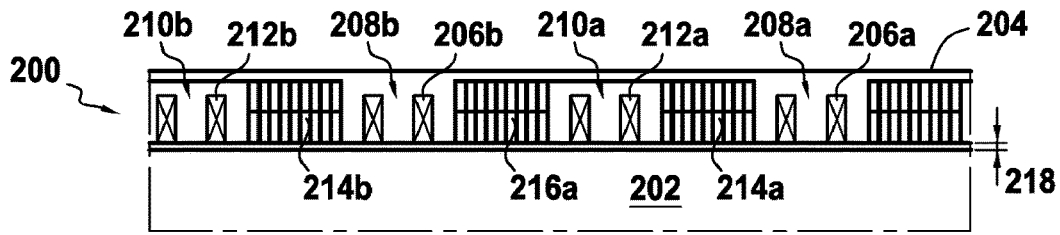
FIG. 5 shows a second example of an electric actuator in accordance with the invention for controlling inlet guide vanes of the FIG. 1 engine and that is a linear actuator.

It should be noted that although the above description is given for a configuration of a rotary motor, it is clear that the description is given by way of example and that a configuration for a linear motor can be just as suitable, as shown in FIG. 5.

Thus, such a linear piezoelectric motor 200 comprises a movable portion 202 and a fixed portion 204. As in the above-described embodiment, the movable portion is connected in fixed manner to the lever that actuates the inlet guide vanes and the movable portion has a fixed connection to a stationary portion of the engine. Magnetic bodies, distributed at regular intervals around the periphery of this movable portion and fastened to the fixed portion, co-operate with associated windings 206a-206 to form stationary electromagnets 208a-208b that are positioned at regular intervals. The magnetic bodies may also constitute an integral portion of this fixed portion. Movable electromagnets 210a-210b (each formed of magnetic bodies and of associated windings 212a-212b) are arranged between these stationary electromagnets, each stationary electromagnet being secured on either side to a piezoelectric element 214a-114b; 216a-216b each made up of a series of ceramics arranged in one or more layers, the inside faces of these various components forming a common line of contact that is tangential to the movable portion 202 ("contact" ignoring an airgap 218 that has been enlarged in exaggerated manner for explanatory purposes). With this configuration, the movable electromagnets 210a-210b and the first and second piezoelectric elements 214a-214b; 216a-216b have a degree of freedom of movement in translation along the movable portion 202, without any friction between the stator and the rotor.

Thus, with the invention, due to a direct electrical-to-mechanical conversion and due to control of a simplified design, the weight saving is quite considerable, the weight of the actuator (about 500 grams (g)) can be reduced by a factor of 5 compared to a hydraulic IGV actuator that typically weighs about 2500 g.

Furthermore, the dynamic performance of a piezoelectric actuator is also much improved: up to 200 millimeters per second (mm/s) at full load (100 decanewtons (daN)) compared to 8.5 mm/s for a hydraulic RTM322 type actuator and an improvement in accuracy to within a few micrometers (compared to ±0.2 millimeters (mm) on a RTM322).

The invention claimed is:

1. An electric actuator for inlet guide vanes of a gas turbine engine, the electric actuator comprising a fixed portion secured to a stationary portion of said engine and a movable portion that is mechanically connected to said inlet guide vanes, wherein said electric actuator comprises stationary electromagnets distributed at regular intervals around the periphery of said movable portion and fastened to said fixed portion, and movable electromagnets arranged between said stationary electromagnets, each movable electromagnet being secured on either side to first and second piezoelectric elements, said movable electromagnets and said first and second piezoelectric elements having a degree of freedom of movement relative to said movable portion.

2. The electric actuator according to claim 1, wherein the stationary portion is a stator of a rotary actuator, the movable portion is a rotor of a rotary actuator, and said degree of freedom of movement is a degree of freedom to rotate about an axis of rotation of said rotor.

3. The electric actuator according to claim 1, wherein each piezoelectric element is made up of a series of N ceramics arranged in one or more layers.

4. The electric actuator according to claim 3, wherein said piezoelectric element comprises two superposed layers of ten ceramics arranged in parallel.

5. The electric actuator according to claim 3, wherein said stationary electromagnets constitute an integral portion of said stator, thus forming internal serrations.

6. The electric actuator according to claim 1, wherein said stationary electromagnets are electrically connected in parallel to a first DC voltage source DC1 and said movable electromagnets are electrically connected in parallel to a second DC voltage source DC2.

7. The electric actuator according to claim 6, wherein said DC voltage sources deliver two opposite signals.

8. The electric actuator according to claim 1, wherein said first piezoelectric element is electrically connected in parallel to a first AC voltage source AC1, and said second piezoelectric element is electrically connected in parallel to a second AC voltage source AC2.

9. The electric actuator according to claim 8, wherein said AC voltage sources deliver two sine-wave voltages of opposite phase that are characterized by the following relationships:

$$AC1 = A \sin \omega(t) et\ AC2 = A \sin(\omega(t) + \pi).$$

10. A gas turbine engine comprising at least one electric actuator according to claim 1.

\* \* \* \* \*